April 12, 1966   W. D. VOELKER   3,246,058
METHOD FOR PRODUCING REINFORCED FOAM LAMINATE STRUCTURES
Filed Feb. 28, 1961   9 Sheets-Sheet 2

INVENTOR.
Walter D. Voelker
BY John R. Eubank

ATTORNEY.

April 12, 1966 W. D. VOELKER 3,246,058
METHOD FOR PRODUCING REINFORCED FOAM LAMINATE STRUCTURES
Filed Feb. 28, 1961 9 Sheets-Sheet 4

Fig. 8.

INVENTOR.
Walter D. Voelker
BY John R. Eubank
ATTORNEY.

April 12, 1966 W. D. VOELKER 3,246,058
METHOD FOR PRODUCING REINFORCED FOAM LAMINATE STRUCTURES
Filed Feb. 28, 1961 9 Sheets-Sheet 5

INVENTOR.
Walter D. Voelker
BY John R. Eubank
ATTORNEY.

United States Patent Office 3,246,058
Patented Apr. 12, 1966

3,246,058
METHOD FOR PRODUCING REINFORCED FOAM LAMINATE STRUCTURES
Walter D. Voelker, Philadelphia, Pa., assignor, by mesne assignments, to Allied Chemical Corporation, New York, N.Y., a corporation of New York
Filed Feb. 28, 1961, Ser. No. 92,386
15 Claims. (Cl. 264—47)

This invention relates to production of foam sandwich structures containing internal reinforcement members.

Roof panels comprising two sheets of rigid weather-resistant sheet material and a core of rigid polyurethane foam, have sometimes shown a tendency to sag when subjected for prolonged periods to very warm conditions.

Moreover, the maximum span permitted for such insulation panels has been undesirably short. Moreover improved strength and dimensional stability has been desired in thin sandwich structures for use in paper box manufacture, and in sandwich structures of all thicknesses of plastic foam core. In the manufacture of airplane components, honeycomb paper has been first filled with polyurethane foam, then sliced smooth, and laminated to external sheets to provide a sandwich panel having an attractive strength to weight ratio. The manufacturing techniques appropriate for airplane components are unfortunately too expensive for use in making insulation panels for building construction.

In accordance with certain embodiments of the present invention, a superior sandwich structure consists of two sheets of facing material, an organic foam core and the combination of reinforcement ribs and reinforcement fibers. The invention comprises a method of manufacturing sandwich structures in which method the reinforcement members are fed between the spaced apart forwardly moving sheets subsequent to the coating of at least one of the sheets but prior to the bonding of the structure into a united sandwich whereby the gas displaced by the expanding foam is vented backwardly from the forwardly moving sandwich precursor structure and/or sidewardly, whereby such displaced gas is not trapped in the foam.

The nature of the present invention is further clarified by the accompanying drawings.

Figure 1:
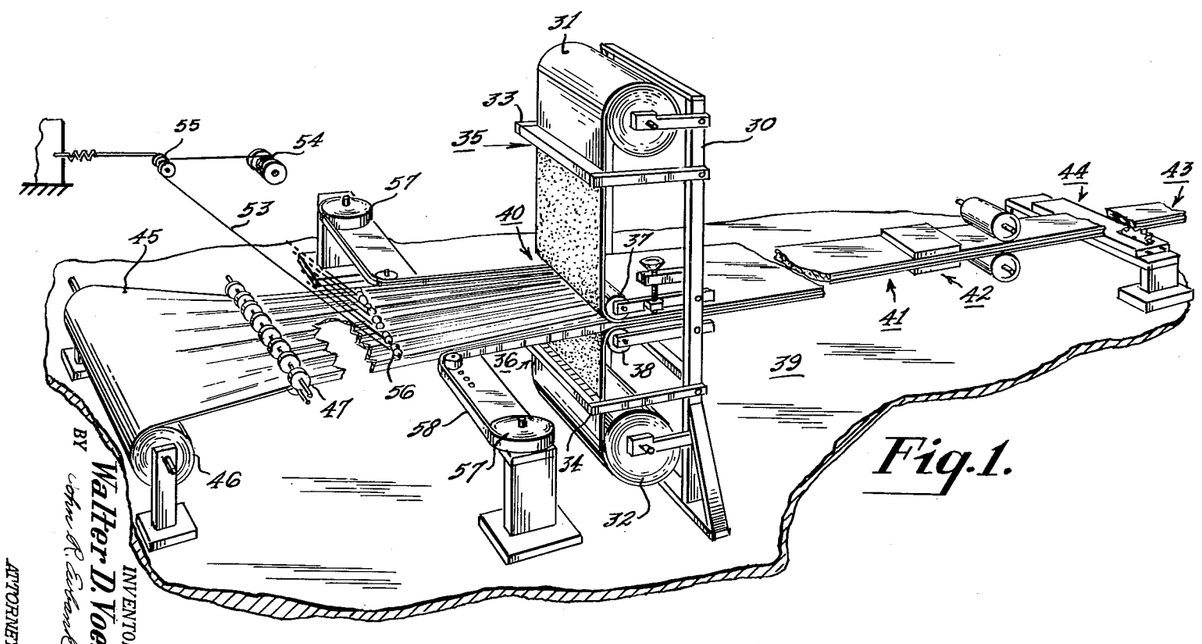
FIGURE 1 is a schematic view of a machine for making reinforced panels having self-foaming plastic core and faces of sheet material such as paper.

Referring now in detail to FIGURE 1, there is shown a frame 30 supporting two feed rolls for the movement of sheet material 31, 32 such as paper through the machine. The sheet material passes over applicators 33, 34 in coating zones 35, 36 in which foam forming chemicals are applied as thin films on the sheet materials 31, 32. A typical formulation for the foam forming chemicals is as follows:

| | |
|---|---|
| Sorbitol | 10 |
| Polypropyleneglycol (molecular weight 2000) | 60 |
| Toluene diisocyanate | 28 |
| Triethylene diamine | 0.7 |
| Water | 3.0 |
| Silicone oil | 0.5 |

The thickness of each of the thin films of foam forming chemicals is generally about 1/20 of the expected thickness of the rigid polyurethane foam core, inasmuch as each film expands to approximately twenty times the applied thickness. Each coated paper passes over rollers 37, 38 so that the two sheets of coated paper move at the same speed and generally parallel to each other with the coatings in opposed relationship. The thus coated sheets of material pass through a foaming zone 39 in which the chemicals react to generate a plastic foam, with the opposed coatings approaching each other. The gas, generally air, between the opposed coatings is displaced by the expanding foam and is pushed backwardly toward the zone 40 between the rollers 37 and 38. As the expanding foams reach each other and bond together in a sandwich bonding zone 41, the air between the faces of the sandwich structure is not trapped in the foam by reason of having been displaced by the controlled foaming action. After the two foams have expanded and bonded together, but while the foam still retains some plasticity, the sandwish structure is passed through a thickness controlling zone 42 in which the thickness of the sandwich structure is controlled within the predetermined limits. The polymerization reactions are completed in or shortly subsequent to the thickness controlling zone 42 and the structure is passed to a withdrawal zone 43, there generally being a panel-cutting zone 44 prior to such product withdrawal zone 43.

Thus in the operation of the previously described portion of the machine, the two sheets of material 31 and 32 are separately coated with a thin film of foam forming chemicals and passed around rollers 37 and 38 into parallel relationship and the coated sheet materials advance while the polyurethane foams expand, thus progressively displacing backwardly the air between the two sheets and the expanding foams eventually meet and merge with each other and the sandwich structure is controlled to be of predetermined thickness in a thickness controlling zone. If a rigid panel is being prepared, the polyurethane foam core hardens to a rigid structure, losing the plasticity characteristic which it had in the sandwich bonding zone and thickness controlling zone. The strip of sandwich structure formed continuously is cut into panels, which are removed at a sandwich panel withdrawal zone. If a flexible sandwich is being prepared, the polymerization of the flexible foam core is substantially completed before the rolling up of the product at the product withdrawal zone.

Particular attention is directed to the method and chronology for inserting reinforcing members. In accordance with the present invention, the reinforcement members are inserted into the sandwich structure subsequent to the coating of the sheet material with foam-forming chemicals but prior to the bonding of the sandwich as a unitary structure. Thus in the final structure, the reinforcement members are adhered securely to the contiguous portions of the rigid polyurethane foam core and the reinforcement members are also adhered to the faces of the sandwich structure. The polyurethane chemical mixtures are effective as adhesives for bonding the surfaces of the reinforcing members to the internal surfaces of the sheet material. Both the sheet material and reinforcement members are selected to bond readily with urethane materials. For example, the sheet material and/or reinforcement members may be paper, but should not be polytetrafluoroethylene or other composition of extremely poor adhesion characteristics.

In FIGURE 1, reinforcing members are formed from paper 45 withdrawn from a roll 46. This paper 45 is fed through a paper shaping device 47. The reinforcing paper 45 may be folded into a predetermined type of cross sectional reinforcement such as an expanded accordian pleat or zig zag shape shown in FIGURE 2, having a plurality of reinforcing members 48–52.

In certain embodiments of the invention, the sandwich structure is further reinforced by filament. Such filaments may be of cotton string, metal wire or other material but particular advantages are achieved by the use of glass fiber, which imparts particular strength to the paper and polyurethane structure. By the use of glass fiber roving, better anchoring of the fiber in the polyurethane foam is achieved. Materials as expensive as glass fiber can be employed in structures as inexpensive as sandwich structures only when they constitute a relatively small percentage by weight of the total structure and only when the bonding of the glass fiber to the sandwich structure is sufficiently strong to justify the additional material cost and processing operations for the inclusion of glass fiber. A glass fiber 53 is fed from a spool 54 through a tension regulator 55 around guide roll 56 to position the fiber so that in the final structure it will be adjacent the line of contact between a reinforcing member and an internal surface of a sheet of the sandwich. A plurality of glass fibers are thus positioned at a plurality of the contact lines. If desired, the bonds between the glass fiber and the reinforcing paper and/or facing sheet can be strengthened by the use of special adhesives such as quick setting epoxy cement.

The folded paper reinforcement member and the glass fibers advance into the insertion zone 40 comprising space between the two rollers 37 and 38, and the polyurethane chemicals coated on the sheets of material 31 and 32 help to bond the folds of the paper and the glass fibers to the internal surfaces of the sheets of material. The glass fiber and paper reinforcement member advance through the machine at the same forward speed as the facing sheet materials of the sandwich structure. As the polyurethane chemicals expand to form a plastic foam, the foam adheres securely to the reinforcement paper. The air between the opposing coated sheets 31 and 32 is progressively displaced by the expanding foam and exhaused backwardly toward the insertion zone 40 at which the reinforcing members are fed between the coated sheets. The expanding foams approach and merge with each other in a sandwich bonding zone 41 and the polyurethane foam retains some plasticity during the passage of the structure through a thickness controlling zone 42. The completion of the manufacture of sandwich panels containing the reinforcement members comprises steps such as the cutting of such sandwich material into panels and the withdrawal of the panels from the machine.

If desired the machine may include side sealing type devices such as a reel 57 for feeding tape 58 on each side of the machine, and means for controlling the width of the panel to minimize the oozing of the expanding plastic from the sides of the advancing sandwich structure.

Figure 2:
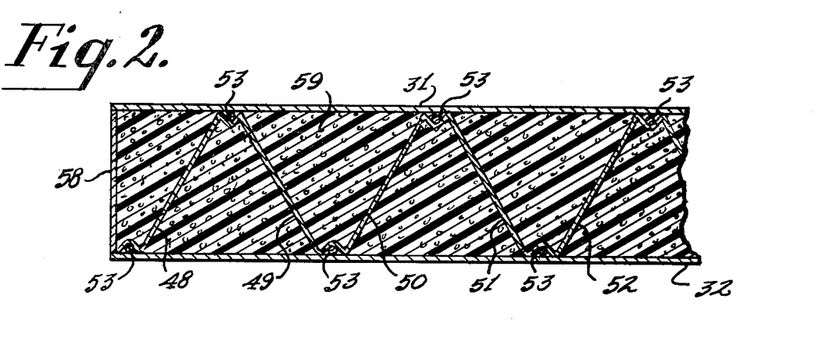
FIGURE 2 is a cross section view of panel prepared on the machine of FIGURE 1.

In FIGURE 2 a cross section of one embodiment of the product produced by the method and machine of FIGURE 1 is shown. The upper face 31 of paper is bonded to a polyurethane foam core 59, which is also bonded to the bottom face 32 of paper. The side sealing tape 58 protects the edges of the foam core from mechanical damage. Particular attention is directed to the plurality of reinforcing members 48, 49, 50, 51 and 52 running longitudinally through the sandwich structure. These reinforcing members are bonded to the foam core and to each of the faces of the sandwich structure. Although light in weight, the reinforcing members greatly strengthen the dimensional stability and stiffness and strength of the sandwich panel when employed as a beam. Thus if the sandwich panel is utilized as a roof deck, the presence of the several reinforcing members reduces the magnitude of the sag of the panel when spanning a considerable distance. Glass fibers 53 are bonded to each face of the sandwich structure and bonded to the reinforcing members near the lines of contact with the internal surfaces of the faces of the sandwich. Such glass fibers increase the loading capacity for the panel when employed as a beam spanning a considerable distance. As shown in FIGURE 2 the reinforcing members may be formed by folding a sheet of paper to that a glass fiber is accommodated at each fold of the accordion pleating.

Figure 3:
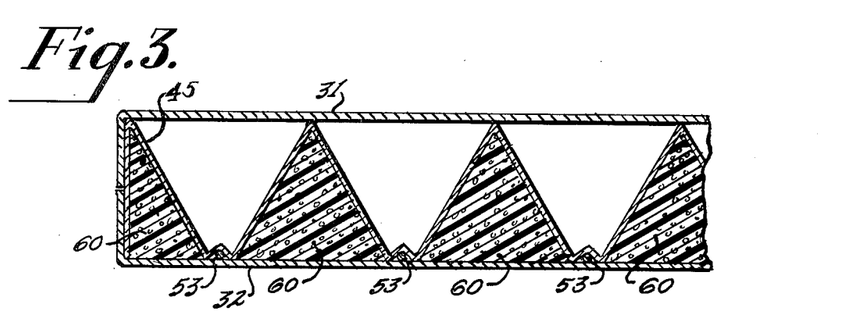
FIGURE 3 is a cross sectional view of an alternative embodiment of a panel.

In an alternative embodiment of the invention shown in FIGURE 3 a polyurethane foam 60 is placed in only half of the volume between the two faces of the sandwich structure. Side sealing tape 58 may be omitted by adhering the face sheets against a fold of the reinforcing paper 45.

Figure 4:
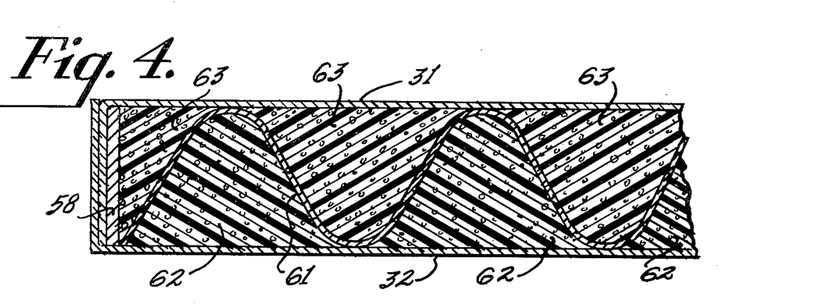
FIGURE 4 is a cross sectional view of a second modification of a panel.

As shown in FIGURE 4, a reinforcing member 61 may be shaped as a corrugated or wave pattern instead of an accordion fold, and the glass fibers may be omitted. Two portions 62 and 63 of the foam core may be of different composition to achieve an advantageous combination of properties in the sandwich structure. A side-closing member 58 may be positioned at the edge of the panel, and the facing papers may be folded thereover to seal the edges of the panel more securely.

Figures 5, 6, 7:
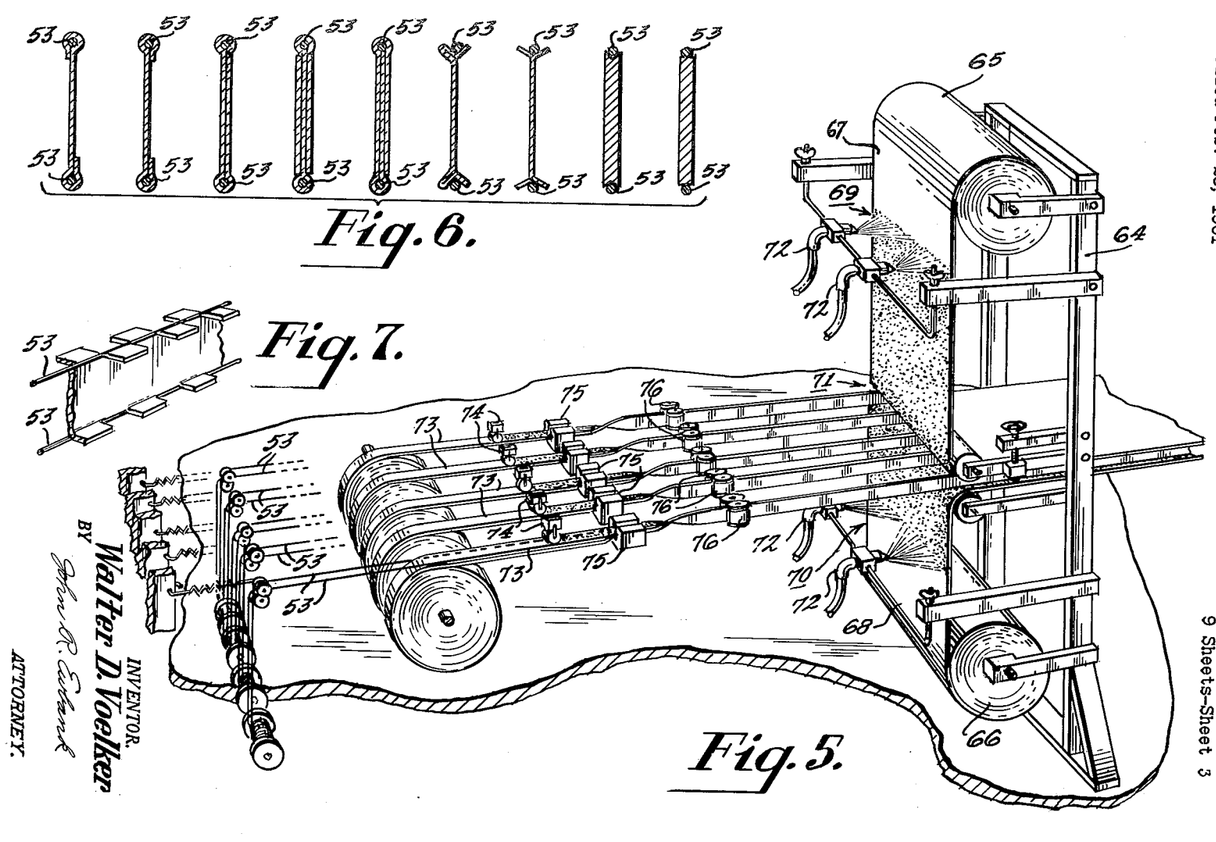
FIGURE 5 is a schematic view of a machine for making sandwich panels, and is an embodiment differing from that shown in FIGURE 1.
FIGURE 6 is a schematic representation of various arrangements for the combination of reinforcing fibers and a reinforcing rib.
FIGURE 7 is a schematic representation of another arrangement for the combination of reinforcing fibers and a reinforcing rib.

In that embodiment of the invention shown in FIGURE 5, a frame 64 supports feed rolls 65, 66 of facing material 67, 68. The sheet material advances from a feed position through coating zones 69 and 70 toward a reinforcement insertion zone 71, and then through a foam generation zone, sandwich uniting zone and product withdrawal zone which zones function as the corresponding zones of FIGURE 1. In each of the coating zones 69 and 70, the desired mixture of polyurethane chemicals is applied to the sheet material by spray guns 72. As shown in FIGURE 5, a plurality of webs 73 of reinforcing members are directed through adhesive applicators 74, web shaping devices 75 and guides 76 so that a glass fiber reinforcement 53 can be secured to each edge of each reinforcing web prior to the entry of the reinforcing web into the reinforcement insertion zone 71. As shown in FIGURES 6 and 7 a glass fiber 53 may be secured at an edge of a reinforcing member by any of several arrangements of folding of the member. When the reinforcing member is strengthened by the glass fibers at the top and bottom thereof, its usefulness in the sandwich structure is greatly enhanced. If the sandwich structure is a rigid panel, the glass fiber reinforced members permit the attainment of beam strengths significantly greater than normally associated with low density insulation panels. Moreover the glass fiber reinforced members are of great value in the flexible foam sandwich structures, imparting tensile strength and dimensional stability thereto.

Figure 8:
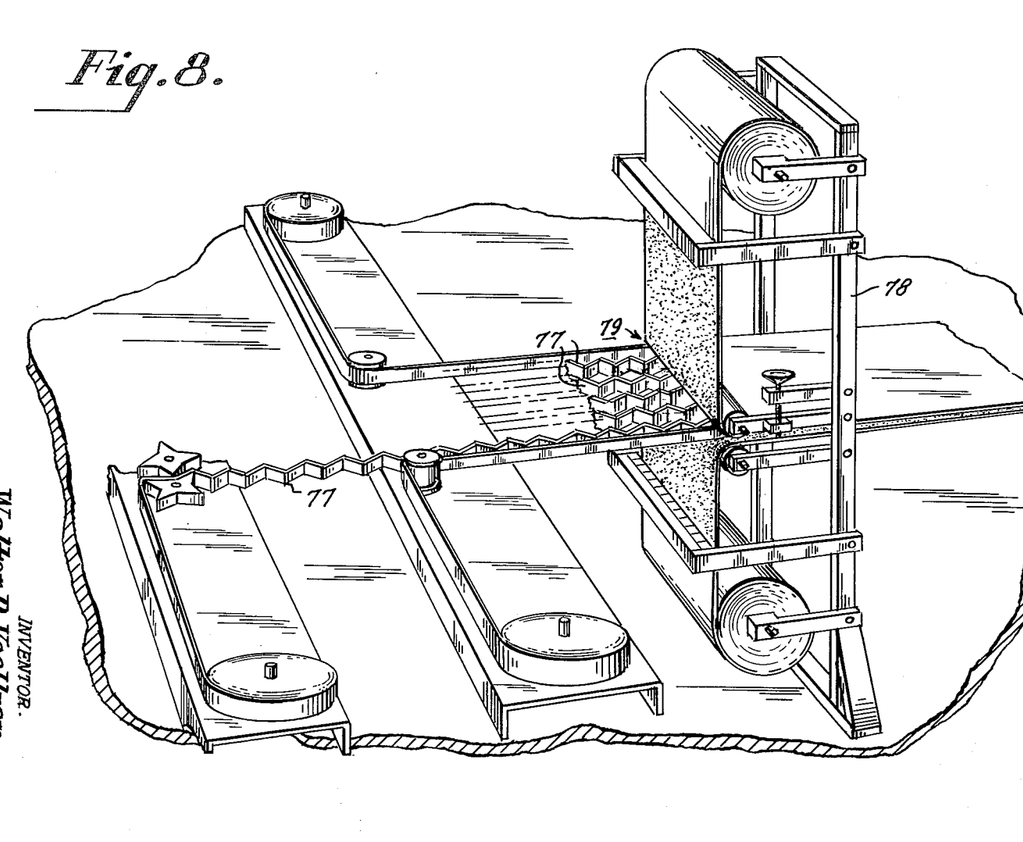
FIGURE 8 is a schematic view of another modification of the mechanism for feeding internal reinforcement members into the sandwich structure.
Figures 9, 10:
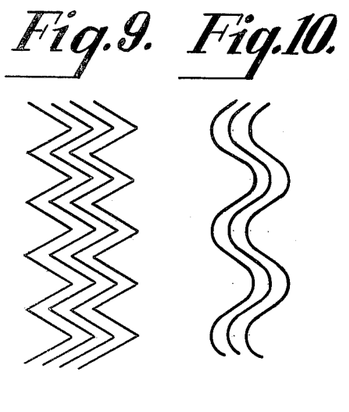
FIGURES 9–13 are top views of arrangements of reinforcement members prepared by apparatus of the type shown in FIGURE 8.
Figure 11:
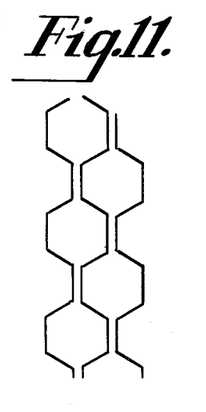
Figure 12:
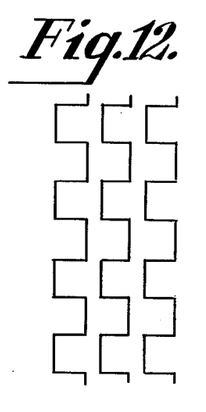
Figures 13, 14, 15, 16:
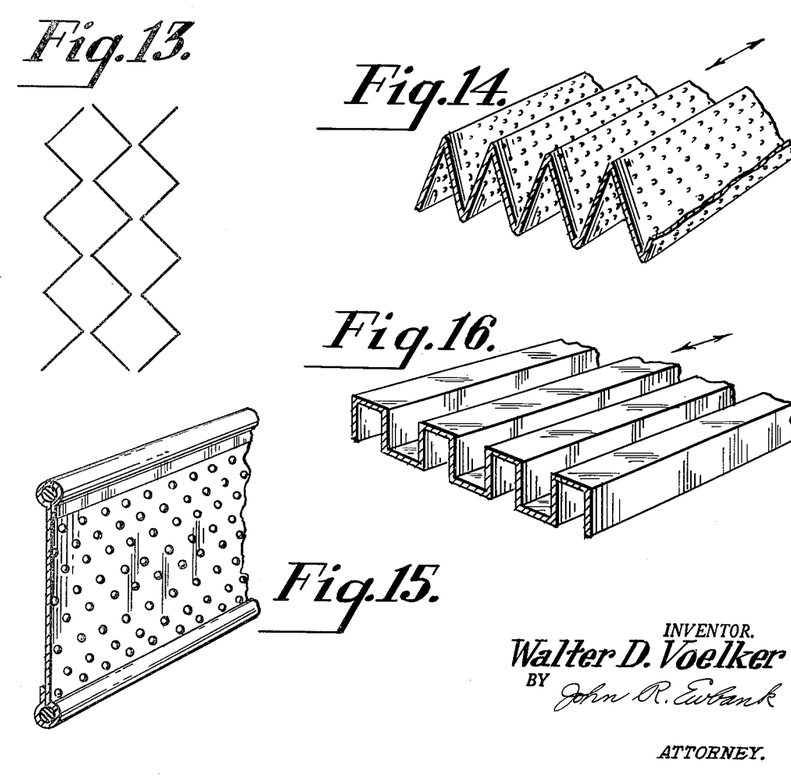
FIGURE 14 and FIGURE 15 illustrate perforated reinforcing members.
FIGURE 16 illustrates a configuration for a reinforcing member that may be applied in accordance with the apparatus of FIGURE 1.

As shown in FIGURE 8 a plurality of reinforcing members 77 can be fed to sandwich making machine 78 and subjected to appropriate folding operations to fold the reinforcing webs 77 shortly before the insertion of the thus folded reinforcing members 77 into the sandwich structure at an insertion zone 79. By this arrangement, a variety of reinforcing patterns are possible which might appear unattainable by alternative procedures. Previous workers have found that sandwich structures comprising reinforcing members of honeycomb paper have desirable strength to weight ratios. In order to achieve such polyurethane foam reinforced honeycomb sandwich structures, it has been necessary to prepare the honeycomb paper member, expand the polyurethane foam in and around the honeycomb member, trim the significant amount of waste material to provide a uniform core, and then laminate the facings of sheet material on to the thus preshaped core. By the use of folding arrangements indicated schematically in FIG. 8, it is possible to achieve substantially the same type of sandwich panel by a continuous production arrangement. Schematic top views of some of the appropriate arrangements for reinforcement members of the type made by the apparatus of FIG. 8 are shown in FIGURES 9–13. In each configuration, air entrapment would be eliminated by backward displacement of the air. In order to minimize the likelihood of adverse pressure differences during the expansion of the foam, the reinforcing members may be perforated, as indicated in FIGURES 14 and 15. In order to secure greater surface of contact between the reinforcing members and the internal faces of the sandwich, a reinforcing member may be provided with relatively wide bonding surface as shown in FIGURE 16.

Figure 17:
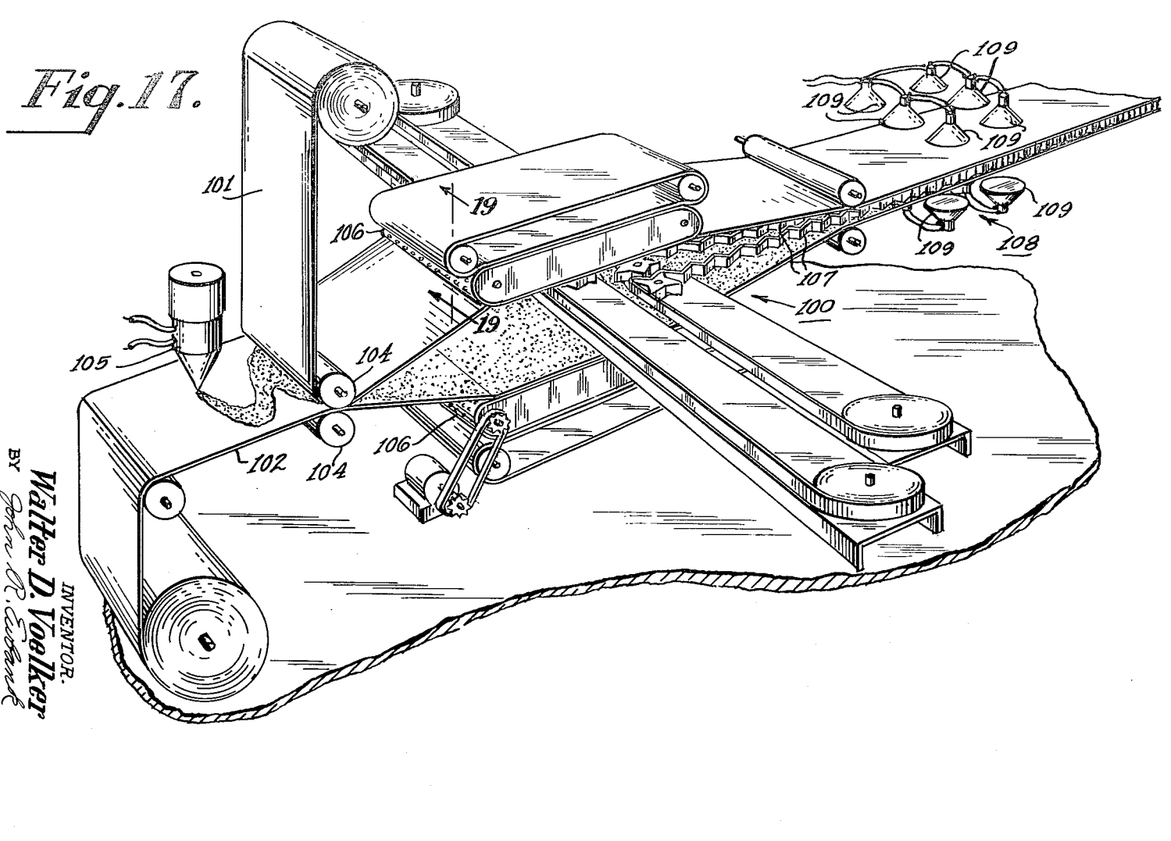
FIGURE 17 and FIGURE 18 are schematic views of a machine for making sandwich structures, and represent an embodiment differing in certain respects from the machine in FIGURES 1 and 8.
Figures 18, 19:
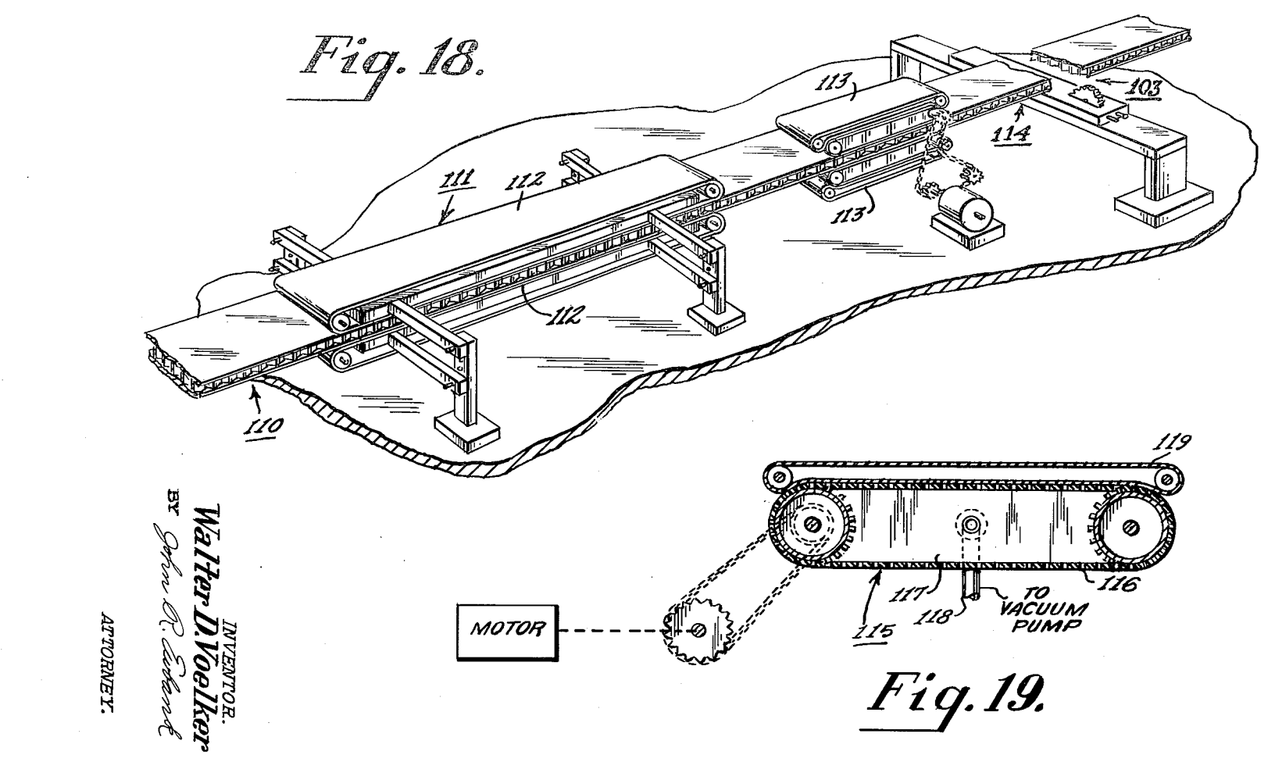
FIGURE 19 is a schematic view of a vacuum belt of the machine of FIGURES 17 and 18.

As shown in FIGURES 17 and 18, the sandwich panel making apparatus may include a reinforcement insertion zone 100. The sheets of facing material 101, 102 start their forward travel toward a product removal zone 103 and thereafter enter the reinforcement insertion zone 100 in which the sheets are spaced apart from each other. In making thin sandwich structures, great difficulty is encountered in applying films of polyurethane chemicals thin enough to achieve the low density thin structures. Advantages are achieved by applying the polyurethane chemicals between adjustable metering rolls 104 in such a manner that the wiping action of the forwardly moving sheets of material helps achieve precise metering of the thin film of polyurethane chemicals from a laterally traversing dispenser 105 onto the sheet materials 101, 102. The coated sheets of materials are separated after leaving the metering rolls 104, and approximately half of the total supply of polyurethane chemicals is retained as a film on each of the thus separated sheets. A pair of vacuum belts 106 may be employed to maintain the separated sheets at predetermined positions to provide the desired angle of separation for the sheets of material after they leave the metering rolls 104. The sheet materials advance through the metering rolls 104 and through the reinforcement insertion zone 100 in which the coated sheet materials are spaced apart sufficiently to permit the insertion of the desired reinforcing members 107. The sheet materials then advance toward a foam generation zone 108 in which heat may be applied by lamps 109 to control the expansion of the polyurethane foam material. The air between the facing sheets is displaced backwardly as the foam expands so that no air is entrapped as the foams unite in a sandwich uniting zone 110. It is generally desirable to employ a dimensional controlling zone 111 in which the thickness of the sandwich structure is controlled within predetermined limits by pressure belts 112 while the polyurethane foam plastic retains sufficient plasticity to undergo further expansion and/or compression for achieving such control of the thickness of the sandwich. The main driving of the sheet material may be applied at the portion of the production line at which the polyurethane foam core has set substantially completely. For this purpose, a pair of vacuum belts 113 is desirably employed for inducing the forward movement to the sandwich production. If the production line is adapted for making rigid panels, a panel cut off zone 114 can be provided prior to the product withdrawal zone. Alternatively if resilient sandwich structure is produced, the product may be withdrawn as a roll of product or in other appropriate manner.

As shown in FIGURE 19, a vacuum belt 115 may include a perforated endless belt 116 rotating about a vacuum chamber 117 which may be maintained at a reduced pressure by a duct 118 connected with a vacuum pump. In order to concentrate the effect of the vacuum on the portion of the belt in contact with the sheet material, an unperforated belt 119 is in contact with that portion of the thread of the perforated belt opposite the portion contacting the sheet material. By the use of such vacuum belt for the positioning and movement of the sheet material, the atmosphere air pressure is utilized to press the sheet material against the moving vacuum belt but the sheet material can advance smoothly without the frictional problems encountered in the use of prior art vacuum plates.

Figures 20, 21:
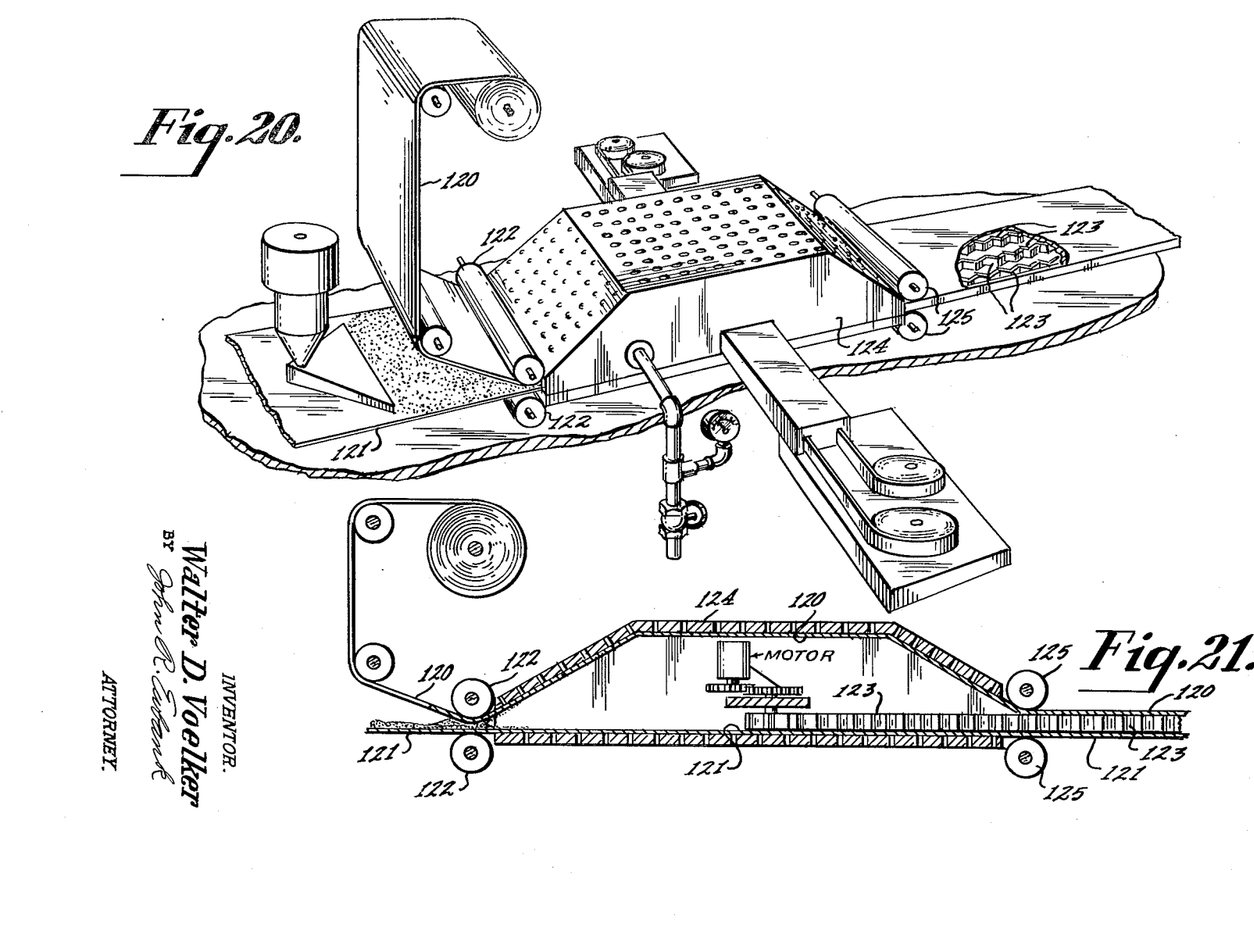
FIGURES 20 and 21 are schematic and cross sectional views respectively of a pressurized box which may be employed in a modification of the machine of FIGURES 17 and 18.

As shown in FIG. 20, positive pressure of a gas such as air, humidified air, nitrogen, carbon dioxide, and/or fluorochlorohydrocarbons may be employed to separate two sheets of facing material 120, 121 after being coated with polyurethane chemicals at metering rolls 122 but prior to the insertion of the reinforcement members 123 between the coated sheets. FIGURE 21 is a cross sectional view of one means by which reinforcement members 123 may be inserted into the potential sandwich while the two coated facing sheets 120 and 121 are separated by positive air pressure. The upper sheet 120 is passing along the ceiling of a pressurized box 124 while the lower sheet 121 passes along the floor of the pressurized box 124, positioning rolls 125 guide the sheet materials into the paths for travel through the subsequent zones of sandwich manufacture. Pressure belts such as the pressure belt 112 of FIGURE 18 may be employed.

Figures 22, 23:
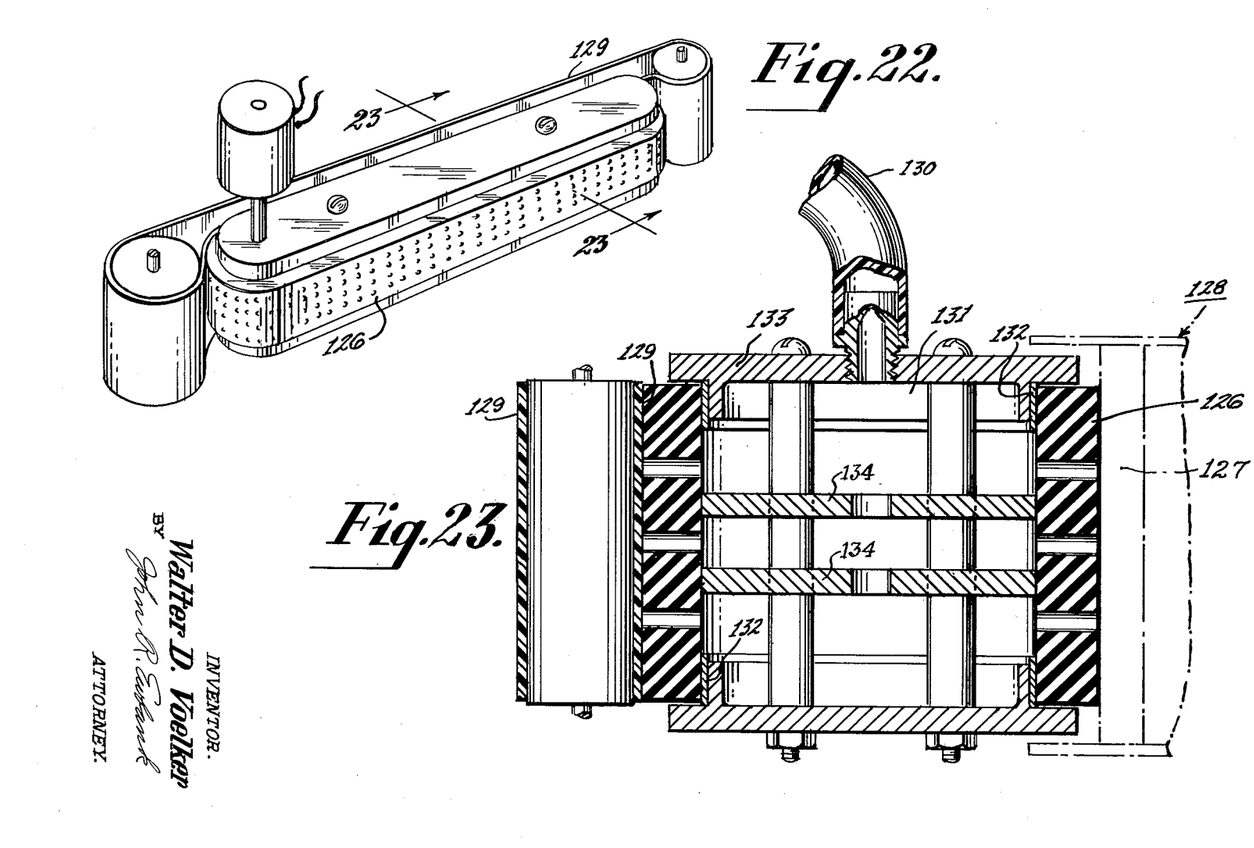
FIGURES 22 and 23 are schematic views of modifications of the vacuum belt of FIGURE 19.

As shown in FIGURES 22 and 23, a vacuum belt 126 may be employed to position a side member 127 at the edge of a foam product 128 and the vacuum belt 126 may be effective by reason of the supplemental sealing belt 129 along that portion of the perforated belt opposite from the contact portion of the vacuum belt. A duct 130 connects a vacuum pump with a vacuum chamber 131 of the vacuum belt 126. In a preferred embodiment, a bearing strip 132 between the perforated belt 126 and the housing 133 provides a long wearing surface. The housing 133 may include internal reinforcing members 134.

Numerous variations are possible without departing from the inventive concepts discussed herein. The sheet material may be rigid or flexible and although generally as impermeable as metal or paper may if desired be of a permeable quality such as a textile fabric. The sandwich structure may have faces of different sheet materials. The foam core may be rigid or flexible and may have a density within the range from about 1 to about 40 lbs. per cut ft. Although the descriptions are simplified by reference to various polyurethane compositions, other foam forming chemicals such as polystyrene, polyvinylchloride, polypropylene, polysiloxanes, sponge rubber and self-forming epoxy and/or alkyd resins may be employed. Pre-formed hollow spheres and/or other fillers can be included in the composition for producing the foam core. The reinforcing members may be porous or impermeable, solid or perforated, organic or inorganic and/or subject to the other variations demanded by the nature of the end use of the products. Similarly the fiber employed to further strengthen the sandwich structure may be glass fibers, metal fibers or organic fibers and may be monofilaments, threads, multiple filaments and/or rovings. Various modifications may be made in the apparatus without departing from the concept of inserting the reinforcing members into the sandwich structure subsequent to the coating of a sheet material with foam forming chemicals but prior to the sandwich uniting step of the standwich manufacture. For example, the sheet materials may advance vertically instead of horizontally.

In the start-up of a production line for the manufacture of reinforced sandwich members in accordance with the present invention, the sheet materials and reinforcing members can be separately fed through the machine prior to any production, but after the production line is in operation the reinforcement members are drawn through the machine by reason of the advancement of the sandwich structure toward the product withdrawal zone. In the shut-down of the production line, the supply of chemicals to the coating zone is terminated and the coating operation is terminated prior to the normal closing down of the unit. Limited amounts of sub-standard product generally result from any emergency shut-down and start-up operations, hence, precautions are taken to minimize the likelihood of failure of the utilities to the apparatus.

In apparatus in which the starting sheet material, prior even to any coating with foam forming chemicals, consists of a series of rigid panels, vacuum belts are employed to position and advance the pairs of panels through the various stages of the method, whereby the foam forming chemicals are applied to such sheet material prior to the zone of insertion of the reinforcement member.

Various modifications of the invention can be made without departing from the obvious modifications of the novel disclosures herein, and the scope of the invention should be evaluated not by illustrative examples, but by the appended claims.

The invention claimed is:

1. The method of preparing a foam sandwich structure having internal reinforcing ribs which comprises the steps of: (1) advancing two facing sheets from a feed position through a coating zone wherein at least one of the moving sheets is coated with a thin film of polyurethane foam-forming chemicals; (2) directing the moving sheets in spaced apart opposing relationship, in which a coated surface faces the opposing facing sheet, through a reinforcement feeding zone wherein reinforcing ribs that are moving with the same forward speed as the said facing sheets, and that are longitudinally directed and disposed over a major portion of the width of the said facing sheets, are introduced into the space between the said facing sheets and into contact therewith, said reinforcing ribs being constructed and arranged so as to extend substantially from one facing sheet to the opposing facing sheet in the sandwich structure and being inserted between said facing sheets prior to substantial generation of a rising foam layer from said foam-forming chemicals; (3) directing the said facing sheets and the said reinforcing ribs into a foam generation and sandwich bonding zone wherein the foam-forming chemicals generate a foam core with the gas between the advancing facing sheets being driven backwardly toward the said reinforcement feeding zone, said foam core being disposed between the said facing sheets to form a foam sandwich and being bonded to at least one of the said facing sheets and also to the said reinforcing ribs which extend substantially from one facing sheet to the opposing facing sheet and are bonded thereto; and (4) withdrawing at a product withdrawal position a foam sandwich structure having internal reinforcing ribs.

2. The method of claim 1 wherein both facing sheets are coated with foam-forming chemicals.

3. The method of claim 2 wherein the foam-forming chemicals coated on the two facing sheets are of differing composition.

4. The method of claim 1 wherein only one facing sheet is coated with foam-forming chemicals and the opposing facing sheet is bonded to the reinforcing ribs with an adhesive.

5. The method of claim 1 wherein side sealing tape is incorporated in the foam sandwich structure adjacent to each longitudinal edge thereof.

6. The method of claim 1 wherein at least one of the facing sheets is folded over the longitudinal edges of the foam sandwich structure and adhered thereto.

7. The method of claim 1 wherein both facing sheets are folded over the longitudinal edges of the foam sandwich structure and adhered to each other along said longitudinal edges.

8. The method of claim 1 wherein longitudinally directed filaments are incorporated in the foam core.

9. The method of claim 8 wherein the said filaments are positioned adjacent the lines of contact of the said reinforcing ribs and the said facing sheets.

10. A method of preparing a foam sandwich panel having internal reinforcing ribs which comprises the steps of: (1) advancing two facing sheets from a feed position through a coating zone wherein at least one of the moving sheets is coated with a thin film of polyurethane foam-forming chemicals; (2) directing the moving sheets in spaced apart opposing relationship, in which a coated surface faces the opposing facing sheet, through a reinforcement feeding zone wherein reinforcing ribs that are moving with the same forward speed as the said facing sheets, and that are longitudinally directed and disposed over a major portion of the width of the said facing sheets, are introduced into the space between the said facing sheets, and into contact therewith, said reinforcing ribs being constructed and arranged so as to extend substantially from one facing sheet to the opposing facing sheet in the sandwich structure and being inserted between said facing sheets prior to substantial generation of a rising foam layer from said foam-forming chemicals; (3) directing the said facing sheets and the said reinforcing ribs into a foam generation and sandwich bonding zone wherein the foam-forming chemicals generate a foam core with the gas between the advancing facing sheets being driven backwardly toward the said reinforcement feeding zone, said foam core being disposed between the said facing sheets to form a foam sandwich and being bonded to at least one of the said facing sheets and also to the said reinforcing ribs which extend substantially from one facing sheet to the opposing facing sheet and are bonded thereto; (4) advancing the said foam sandwich through a thickness controlling zone wherein a controlled pressure is applied to the said foam sandwich; (5) advancing the said foam sandwich through a panel-cutting zone wherein the said foam sandwich is cut into panels of predetermined length; and (6) withdrawing at a product withdrawal position a foam sandwich panel having internal reinforcing ribs.

11. The method of preparing a foam sandwich structure having internal reinforcing ribs which comprises the steps of (1) advancing two facing sheets from a feed position through a coating zone wherein polyurethane foam-forming chemicals are applied to at least one of the moving sheets; (2) passing the said facing sheets with the foam-forming chemicals therebetween through metering rolls whereby the thickness of the interposed layer of the said foam-forming chemicals is precisely controlled; (3) separating the said facing sheets so that a thin film of the said foam-forming chemicals is retained on each facing sheet; (4) advancing the said facing sheets in spaced apart opposing relationship through a reinforcement feeding zone wherein reinforcing ribs that are moving with the same forward speed as the said facing sheets, and that are longitudinally directed and disposed over a major portion of the width of the said facing sheets, are introduced into the space between the said facing sheets and into contact therewith, said reinforcing ribs being constructed and arranged so as to extend substantially from one facing sheet to the opposing facing sheet in the sandwich structure and being inserted between said facing sheets prior to substantial generation of a rising foam layer from said foam-forming chemicals; (5) directing the said facing sheets and the said reinforcing ribs into a foam generation and sandwich bonding zone wherein the foam-forming chemicals generate a foam core with the gas between the advancing facing sheets being driven backwardly toward the said reinforcement feeding zone, said foam core being disposed between the said facing sheets to form a foam sandwich and being bonded to both of the said facing sheets and also to the said reinforcing ribs which extend substantially from one facing sheet to the opposing facing sheet and are bonded thereto; and (6) withdrawing at a product withdrawal position a foam sandwich structure having internal reinforcing ribs.

12. The method of claim 11 wherein the foam-forming chemicals are applied to the moving sheet by a laterally traversing dispenser.

13. The method of claim 11 wherein the facing sheets are maintained in space apart opposing relationship in the reinforcement feeding zone bypassing them continuously along the perforated floor and perforated ceiling respectively of a pressurized chamber.

14. The method of claim 11 wherein the facing sheets are maintained in spaced apart opposing relationship in the reinforcement feeding zone by contacting each facing sheet with the outer surface of an endless porous belt whose inner surface is in communication with a vacuum chamber maintained at subatmospheric pressure, the opposing outer surfaces of the said endless porous belt maintaining simultaneous coextensive contact with the said facing sheet and with the surface of an impervious endless belt.

15. The method of preparing a foam sandwich panel having internal reinforcing ribs which comprises the steps of: (1) advancing two facing sheets from a feed position through a coating zone wherein at least one of the moving sheets is coated with a thin film of polyurethane foam-forming chemicals; (2) passing the said facing sheets with the foam-forming chemicals therebetween through metering rolls whereby the thickness of the interposed layer of the said foam-forming chemicals is precisely controlled; (3) separating the said facing sheets so that a thin film of the polyurethane foam-forming chemicals is retained on each facing sheet; (4) advancing the said facing sheets in spaced apart opposing relationship through a reinforcement feeding zone wherein reinforcing ribs moving at the same forward speed as the facing sheets are introduced into the space between said facing sheets and into contact therewith, said reinforcing ribs being disposed over a major portion of the width of said facing sheets and being constructed and arranged so as to extend substantially from one facing sheet to the opposing sheet in the sandwich structure and being inserted between said facing sheets prior to substantial generation of a rising foam layer from said foam-forming chemicals; (5) directing said facing sheets and the said reinforcing ribs into a foam generation and sandwich bonding zone wherein the foam-forming chemicals generate foam bonded to said facing sheets and also to said reinforcing ribs to form a foam sandwich panel structure; and (6) withdrawing at a product withdrawal position said foam sandwich structure having internal reinforcing ribs.

References Cited by the Examiner

UNITED STATES PATENTS

| | | | |
|---|---|---|---|
| 1,481,866 | 1/1924 | Heist. | |
| 1,956,091 | 4/1934 | Carson | 156—463 |
| 2,406,051 | 8/1946 | Weiss | 156—462 |
| 2,486,196 | 10/1949 | Nebolsine | 271—74 |
| 2,576,073 | 11/1951 | Kropa et al. | 156—77 |
| 2,680,615 | 6/1954 | Edgar | 271—74 |
| 2,797,729 | 7/1957 | Runton | 156—79 |
| 2,841,515 | 7/1958 | Runton | 156—78 |
| 2,906,189 | 9/1959 | Robertson | 95—77.5 |
| 2,962,407 | 11/1960 | Atkanian | 156—78 |
| 2,973,295 | 2/1961 | Rodgers | 154—100 |
| 3,047,449 | 7/1962 | Coble | 156—79 |
| 3,061,475 | 10/1962 | Wallace | 156—78 |

EARL M. BERGERT, *Primary Examiner.*

C. T. KRAFFT, R. J. CARLSON, *Assistant Examiners.*